UNITED STATES PATENT OFFICE 2,660,584

PROCESS FOR PREPARING 17-CARBALKOXY STEROIDS

Alfred L. Wilds, Madison, Wis., assignor to Wisconsin Alumni Research Foundation, Madison, Wis., a corporation of Wisconsin No Drawing. Application July 10, 1951, Serial No. 236,056

8 Claims. (Cl. 260—397.1)

The present invention relates to steroid-like compounds having general utility in the biological art, and includes improved processes of synthesizing steroid-like compounds, and intermediates thereof having utility in the hormone field.

The basic process of the present invention provides means for introducing a carboxy group at the 17-position of $\Delta^{14,15}$-16-keto-steroids, i. e., $\Delta^{1,1'}$ - 2' - keto - cyclopentenopolyhydrophenanthrenes. The process comprises essentially treating a steroid characterized by the $\Delta^{14,15}$-16-keto group with a strong alkali metal condensing agent and reacting the resulting reaction mixture with a di-lower-alkyl carbonate to form the desired $\Delta^{14,15}$-16-keto-17-carbalkoxy-steroid. The reaction may be illustrated by the following general formula:

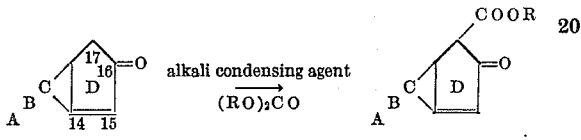

in which R is a lower alkyl group, A, B and C represent the polyhydrophenanthrene portion of the steroid nucleus and D represents the $\Delta^{14,15}$-16-keto-cyclopenteno group or ring.

The following examples will serve to illustrate the present invention:

Example I

*17 - carbethoxy - 1,3,5(10),6,8,14(15) - estrahexaen-16-one.*—Sodium amide was prepared by adding 0.20 g. of sodium in portion to 15 cc. of liquid ammonia containing a small amount of ferrric nitrate. Fifteen minutes after the addition was completed 10 cc. of dry toluene was added and the ammonia was allowed to evaporate, finally heating the mixture in an oil bath until the toluene was refluxing. During this stage and the remainder of the reaction a slow stream of dry nitrogen was passed through the apparatus. Then 1 g. of 1,3,5(10),6,8,14(15)-estrahexaen-16-one, i. e. $\Delta^{1,1'}$-2'-keto-2-methyl-3,4-dihydro-1,2-cyclopentenophenanthrene (prepared as described by Wilds and Beck, J. Am. Chem. Soc., 66, 1692 (1944)) and 5 cc. of dry toluene were added and the mixture was stirred at reflux; after one-half hour 1 cc. of dry diethyl carbonate was added and stirring and heating were continued for approximately nine hours longer. The reaction mixture was cooled, poured into ice water, acidified with acetic acid and the mixture was extracted with benzene. This organic layer was shaken with 10% potassium hydroxide solution, filtered to collect part of the product as an insoluble salt, the filtrate separated and the benzene layer retreated with 10% potassium hydroxide. The insoluble salt and the alkaline layers were combined, acidified with dilute hydrochloric acid, extracted with benzene, and the latter extract washed with sodium bicarbonate solution and dried over anhydrous calcium sulfate. The dry solution was filtered and then concentrated by distilling under reduced pressure, and the residue was recrystallized from methanol containing a small amount of benzene. The desired product was obtained as a crystalline solid, M. P. 136–138.5° C.; further recrystallization raised its melting point to 137.5–140.5° C. This reaction may be illustrated by the following formulas:

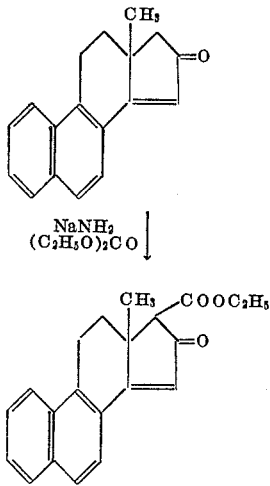

Example II

*17 - carbmethoxy-3-methoxy-1,3,5(10),14(15) - estratetraen-16-one.*—This product is prepared by treating 3-methoxy-1,3,5(10),14(15)-estratetraen-16-one (prepared as described by Wilds and Johnson J. Am. Chem. Soc. 70, 1166 (1948)) with sodium hydride and reacting the resulting reaction mixture with di-methyl carbonate. The process details are similar to those described in Example I.

Investigations have shown that the carboxy group is introduced at the 17-position of the steroid when ring D, the cyclopenteno ring, is characterized by the $\Delta^{14,15}$-16-keto grouping. Rings A, B and C making up the polyhydrophenanthrene may have varying degrees of saturation as shown by the examples. They also may be completely saturated as exemplified by the non-aromatic steroids. Rings A, B and C making up the polyhydrophenanthrene may also contain substituents such, for example, as an alkyl group at the 10 and 13-positions, an alkoxy or hydroxy group at the 3-position, etc.

The alkaline condensing agent employed in the process of the present invention should be of the strong alkali metal type such as sodium methoxide, sodium amide, potassium amide, sodium hydride, potassium t-butoxide, sodium triphenyl methyl and the like. The di-lower alkyl carbonates employed in the process are not critical, although the carboxy group introduced into ring D will be esterified by the particular alkyl group in the alkyl carbonate. The resulting carbalkoxy group can be converted to the free carboxy group by hydrolysis in accordance with known procedures after reduction of the keto group.

In place of the lower alkyl carbonates, esterified lower fatty acids such as ethyl acetate or phenyl acetate may be employed. In such cases the product contains the corresponding 17-acyl group. With the esters of acetic acid the product contains the 17-acetyl group. By selective reduction to eliminate the 16-keto group and saturate the 14,15 double bond, steroids of the pregnane type are obtained.

The present application is a continuation-in-part of application Serial No. 85,537, filed March 29, 1949, now forfeited.

I claim:

1. In the process of introducing a carbalkoxy group at the 17-position in a steroid, the improvement which comprises in reacting a steroid characterized by the $\Delta^{14,15}$-16-keto group with an alkali metal condensing agent and a di-lower-alkyl carbonate.

2. In the process of preparing a $\Delta^{14,15}$-16-keto-17-carbalkoxy-steroid, the improvement which comprises in reacting a $\Delta^{14,15}$-16-keto-steroid with an alkali metal condensing agent and then reacting the resulting reaction mixture with a di-lower-alkyl carbonate.

3. In the process of preparing 17-carbalkoxy-1,3,5(10), 6,8,14(15)-estrahexaen-16-one, the improvement which comprises in reacting 1,3,5(10),6,8,14(15)-estrahexaen-16-one with an alkali metal condensing agent and then reacting the resulting reaction mixture with a di-lower-alkyl carbonate.

4. The process of claim 3, in which the condensing agent is sodium amide and the alkyl carbonate is diethyl carbonate.

5. In the process of preparing 17-carbalkoxy-3-methoxy-1,3,5(10),14(15)-estratetraen-16-one the improvement which comprises in reacting 3-methoxy-1,3,5(10),14(15)-estratetraen-16-one with an alkali metal condensing agent and then reacting the resulting reaction mixture with a di-lower alkyl carbonate.

6. The process of claim 5, in which the condensing agent is sodium hydride and the alkyl carbonate is dimethyl carbonate.

7. The product, 17-carbethoxy-1,3,5(10),6,8,14-(15)-estrahexaen-16-one.

8. The product, 17-carbmethoxy-3-methoxy-1,3,5(10),14(15)-estratetraen-16-one.

ALFRED L. WILDS.

No references cited.